US006837480B1

(12) United States Patent
Carlson

(10) Patent No.: US 6,837,480 B1
(45) Date of Patent: Jan. 4, 2005

(54) BALL VALVE WITH ADJUSTABLE FLOW COEFFICIENT

(75) Inventor: Bengt A. Carlson, Stamford, CT (US)

(73) Assignee: Belimo Holding AG, Wetzikon (CH)

( * ) Notice: Subject to any disclaimer, the term of this patent is extended or adjusted under 35 U.S.C. 154(b) by 0 days.

(21) Appl. No.: 10/049,729

(22) PCT Filed: Aug. 17, 2000

(86) PCT No.: PCT/US00/22582

§ 371 (c)(1), (2), (4) Date: Feb. 14, 2002

(87) PCT Pub. No.: WO01/13019

PCT Pub. Date: Feb. 22, 2001

Related U.S. Application Data

(60) Provisional application No. 60/149,398, filed on Aug. 17, 1999.

(51) Int. Cl.[7] .................................................. F16K 5/06

(52) U.S. Cl. ................... 251/209; 251/315.16; 137/270

(58) Field of Search ................................ 251/208, 209, 251/315.07, 315.16; 137/270

(56) References Cited

U.S. PATENT DOCUMENTS 3,516,638 A * 6/1970 Pigott ................ 251/315.16 X
3,542,338 A * 11/1970 Scaramucci ................. 251/209
3,762,682 A 10/1973 Franck ....................... 251/124
4,212,321 A 7/1980 Hulsey .................. 137/625.32
5,324,008 A * 6/1994 Bonetti .................. 251/315.16
5,370,154 A 12/1994 Greer .................... 137/625.32
5,566,923 A 10/1996 Ennis et al. ........... 251/315.04
5,735,307 A * 4/1998 Charron ...................... 137/270
6,039,304 A 3/2000 Carlson ...................... 251/209

* cited by examiner

*Primary Examiner*—Gene Mancene
*Assistant Examiner*—Eric Keasel
(74) *Attorney, Agent, or Firm*—Thaddius J. Caruis

(57) ABSTRACT

A valve connected to a fluid pipe line and having a valve chamber and at least one inlet port (3) and one outlet port (4), the valve comprising a ball (5) mounted in the valve chamber between a pair of seats (8, 9), and having an exterior surface and two ends and a fluid passageway extending between the two ends, the ball (5) is turned by a stem (6) for selective adjustment between an open and a closed position, with the ball (5) and stem (6) having an axis of rotation perpendicular to the centerline between the inlet (3) and outlet (4) ports, and the ball (5) having the centerline for its fluid flow passageway at an angle different from perpendicular to the axis of rotation of the ball (5).

5 Claims, 6 Drawing Sheets

6
11
15
10
16
8
2
4
3
1
12
5
9

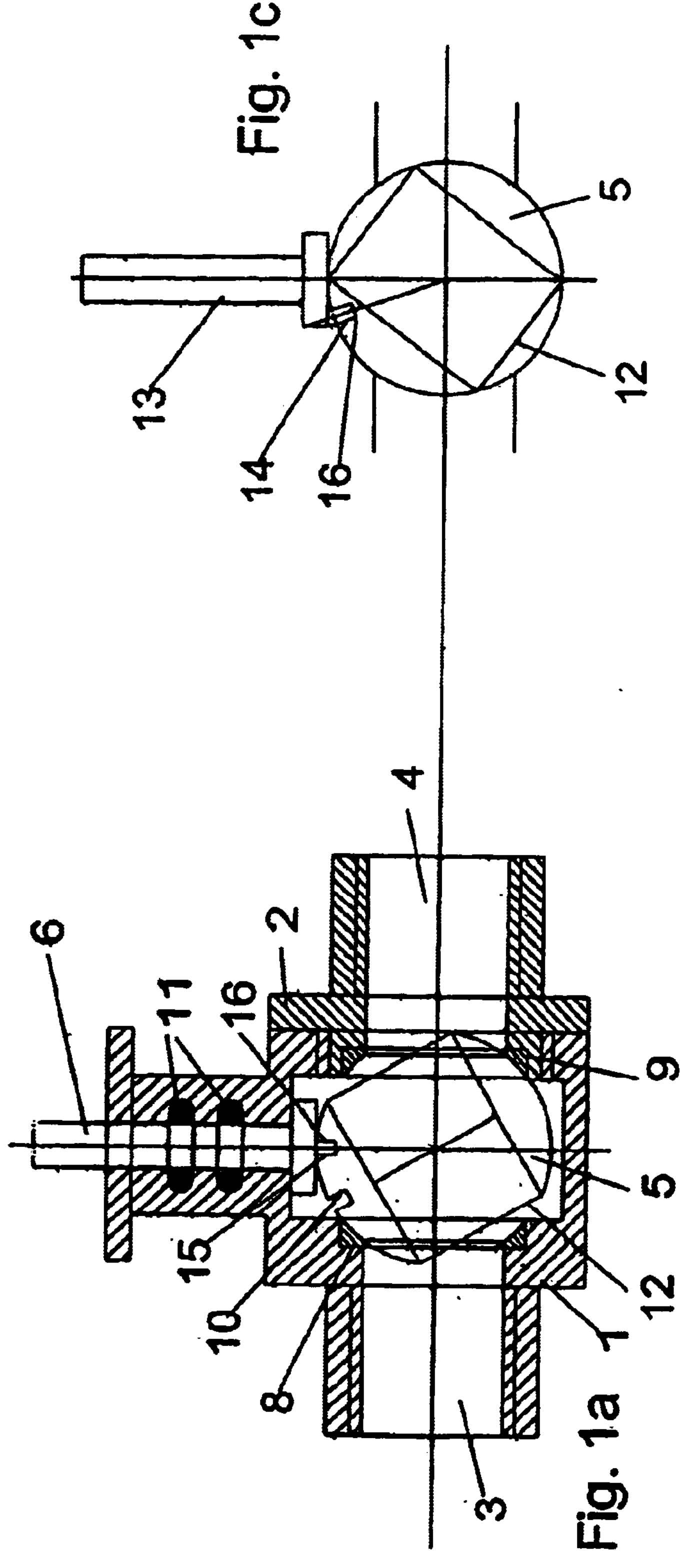
Fig. 1c
5
12
13
14
16
6
11
16
2
4
9
5
15
10
8
1
12
3
Fig. 1a
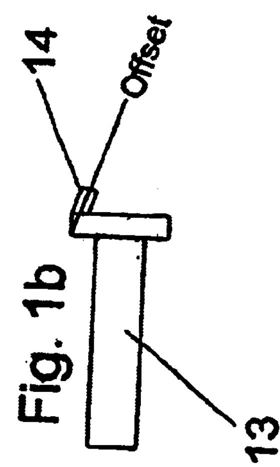
14
Offset
Fig. 1b
13

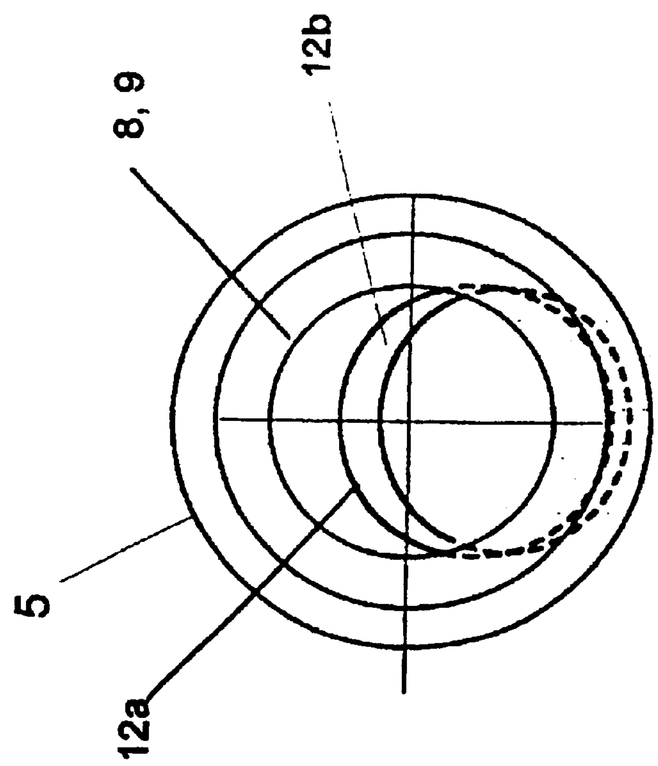
Fig. 2
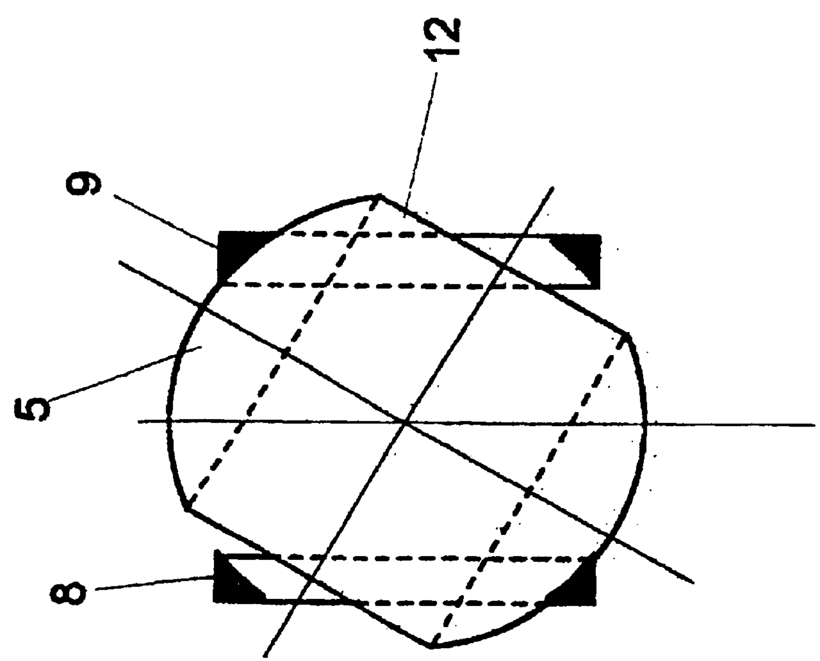

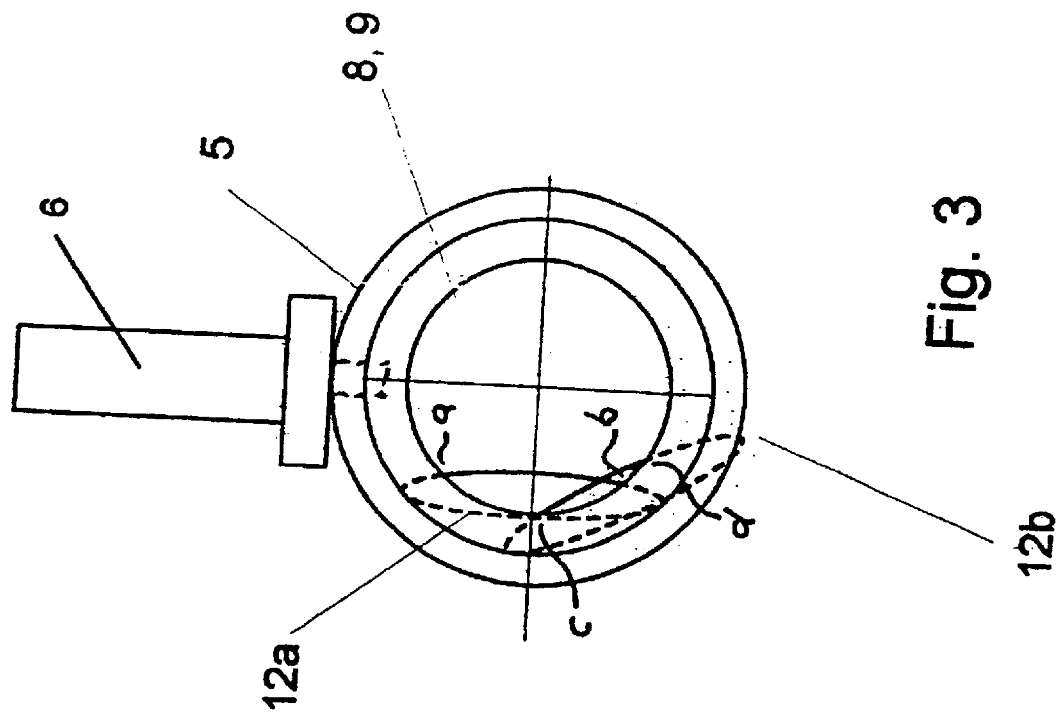
Fig. 3
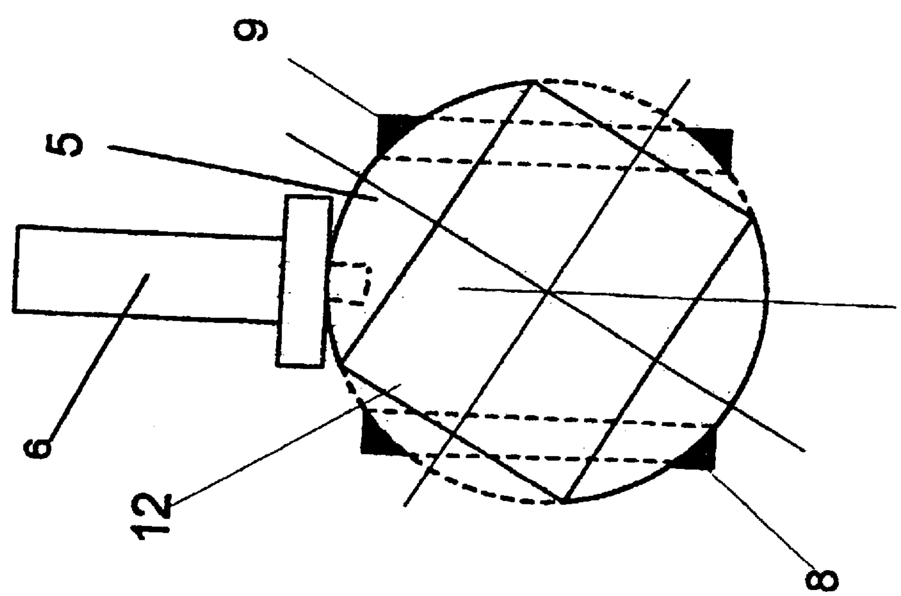

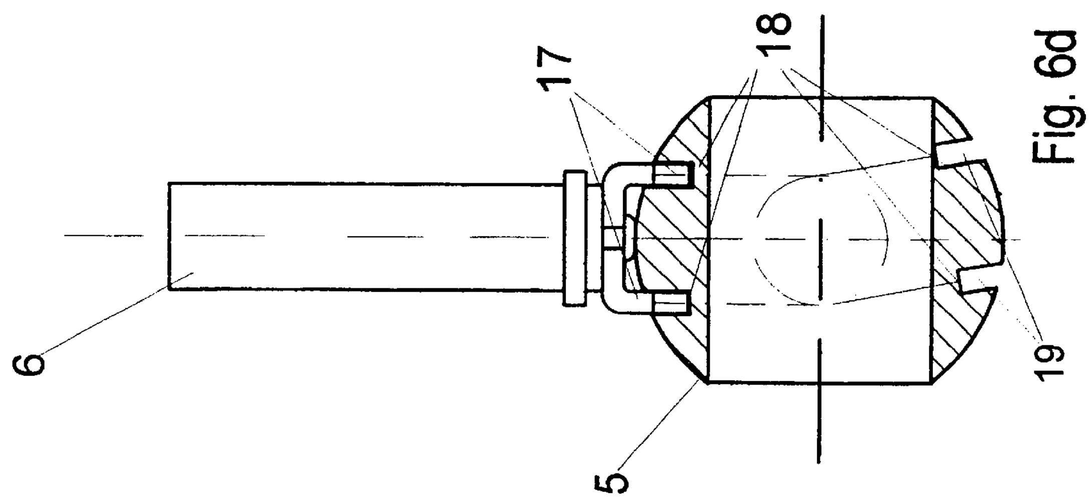
Fig. 6d
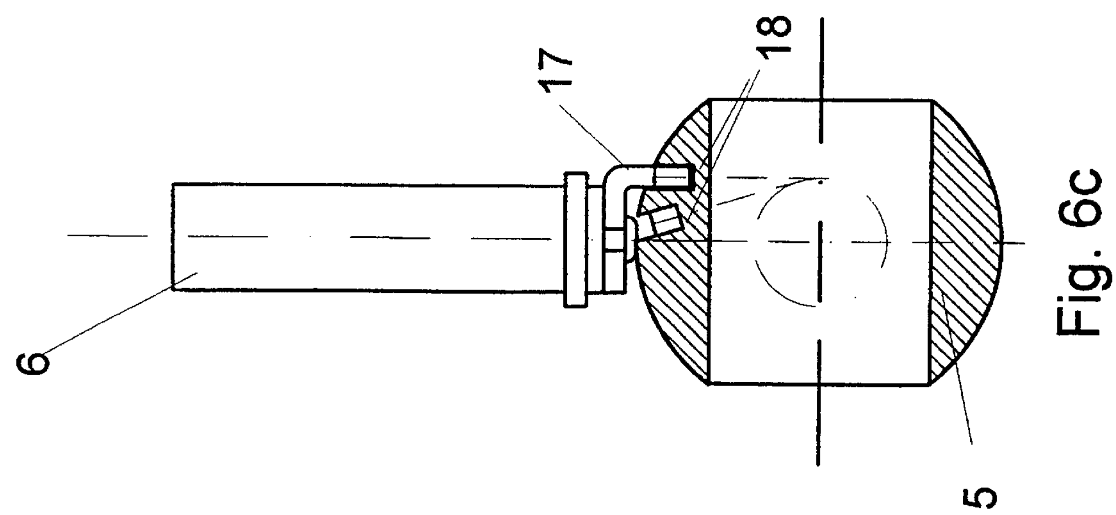
Fig. 6c
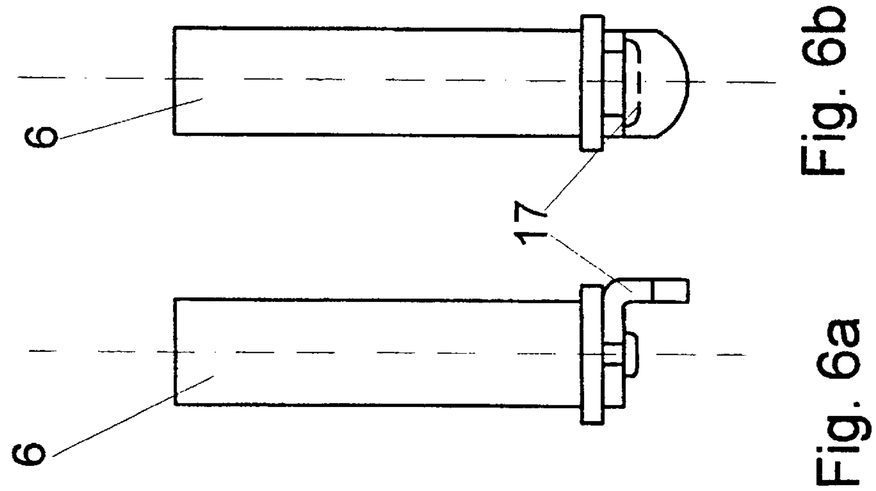
Fig. 6a
Fig. 6b

BALL VALVE WITH ADJUSTABLE FLOW COEFFICIENT

This invention refers to disclosure document 452705 with an USPTO stamp Mar. 8, 1999, and Provisional Patent Application 60/149,398 with a filing date Aug. 17, 1999.

BACKGROUND OF THE INVENTION.

Ball valves are among other things used for modulating control of fluids in HVAC and industrial process applications.

Full ported ball valves have a very large flow coefficient (CV-value) compared to its size. This means that if the valve is connected to a pipe of the same size and the flow rate is within the normally specified range for the pipe size, the pressure drop produced by the ball valve will be very small, when fully open.

The pipe and the controlled object, such as a heat exchanger, coil etc, have much larger pressure drops. This means that the ball valve has very little authority over the flow as it begins to close. The valve needs to close so much that it produces a pressure drop almost as large as the control object and pipe combined, before any significant reduction of the flow rate will take place.

This means that a large portion of the operating range of the valve is ineffectual. Control of the flow will only take place over a very small portion of the operating range, near the closed position. Therefore, it is hard for the actuator to operate the valve to the exact position that supplies the correct flow rate. Even a small movement causes a disproportionately large change in the output from the connected heat transfer device, and control stability is hard to achieve.

The flow coefficient is calculated by multiplying the FLOW (GPM) by the square root of the specific gravity of the fluid and then divide by the square root of the differential pressure (PSI) across the fully open valve.

Valve sizing is based upon the flow coefficient. A valve must have a sufficiently large flow coefficient so the needed maximum flow rate can be supplied. However, it must not be too large because it causes control problems.

The very large flow coefficient of a typical ball valve can be reduced by installing a characterizing disk with an essentially V-shaped opening, that interacts with the bore of the ball in the valve. This also determines the flow characteristics of the valve. U.S. Pat. No. 6,039,304 describes such a disk.

By changing the disk to a new disk with a smaller or larger opening, the flow coefficient can be changed, without replacing the valve.

The disk works very well, but it adds to the cost of the valve, and if the flow coefficient needs to be changed a new disk needs to be ordered and installed. Especially disks used in high temperature and high pressure process applications are relatively expensive.

As an alternative it is possible to use a ball with a specially shaped opening. When the flow coefficient needs to be changed, a new ball with a differently shaped opening is installed. However, this is costly alternative.

It is common that the flow coefficient needs to be changed, because the data the flow coefficient calculations are based upon often are very unreliable and does not reflect the actual operating conditions.

Even if the installed flow coefficient is correct when first installed, future changes in the operation conditions may necessitate a change of the flow coefficient.

THE NEW INVENTION

In a standard ball valve the length axis of the bore through the ball is perpendicular to the length axis of the stem that turns the ball.

The new invention is a conventional quarter turn ball valve. Its stem turns 0–90 degrees and operates the ball as any standard ball valve, with it is maximum opening at 90 degrees and is closed at 0 degrees. The novelty is that the length axis of the bore through the ball is at a different angle than perpendicular to the stem.

This means that the ball is operated at an slanted orientation and the length axis of the bore will never line up with the length axis of the valve body. Not even when the stem is moved to the 90 degree position. The flow coefficient is reduced, by slanting the ball. The reduction becomes larger the more the ball is slanted.

The ball may be disposed so it can be installed in one way only, where it is slanted (offset) by one specific number of degrees. This results in a ball valve with a smaller flow coefficient than what is standard for the valve size. For example, the flow coefficient can be reduced to a value that is typical for a standard globe valve of the same size.

Alternatively, the ball is disposed in such a way that the ball can be installed at a number of different slanted positions. By installing the ball at a number of different slanted positions, the same valve can provide a selection of different flow coefficients. This makes it possible to select a flow coefficient that best fits the application, and if needed changes can easily be made.

There are many different types of ball valves. Two piece ball valves have a body that comprises two parts. The most common and least expensive two-piece ball valve has one of the parts screwed into the other, and secured by for example epoxy. This valve is difficult to take apart and therefore best suited for a ball which is installed in one slanted position only.

Three piece ball valves have a midsection ("body") containing the ball and two connectors ("end caps"). The three pieces are bolted together. It easy to remove the midsection even when the valve is installed in a piping system. This facilitates the adjustment of the ball to the different slanted positions. The three piece ball valve is therefore well suited for balls that can be installed in multiple positions. However any type of ball valve can be used with the invention.

DESCRIPTION OF THE DRAWINGS

FIG. 1*a*, shows a cross section view of a ball valve. The body consists of two pieces (1 and 2). There are two connections (3 and 4) for the piping. There is a fluid passageway between the two connections (3 and 4). In the fluid passageway a ball (5) is installed. Through the ball (5) there is a bore (12). The ball (5) is suspended between two seats (8 and 9). The ball (5) has a number of groves (10 and 16). The first groove (10) is at a 90 degree angle versus the length axis of the bore (12) through the ball (5). The second groove (16) is offset some degrees versus the first groove (16).

Figure 4:
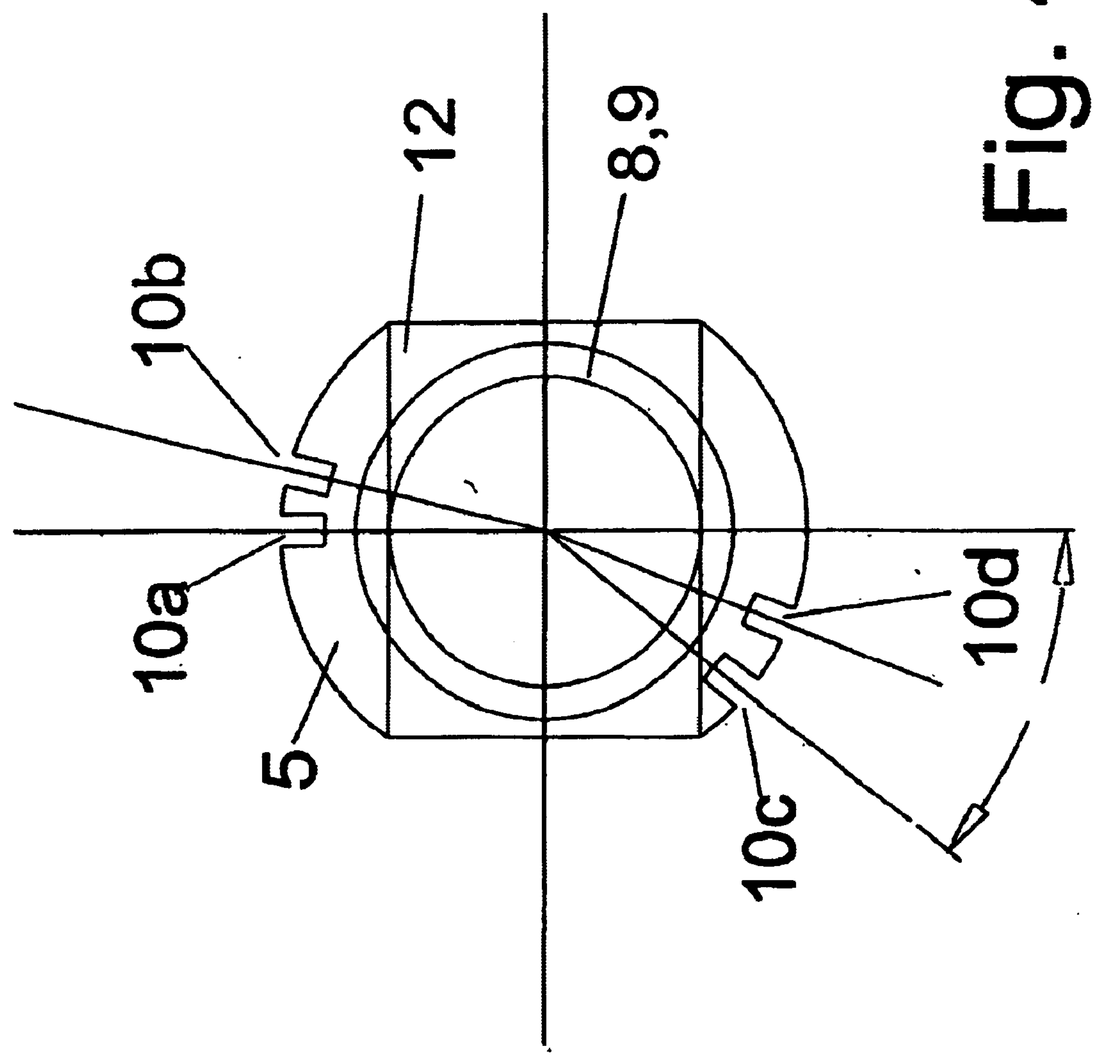

A stem (6), which can be operated by an external actuator, passes through the body (1). O-rings (11) seals the stem (6 or 13) against the body (1).

The at the end of the stem (6) there is a blade (15) that mates with the groove (10 or 16). When the valve is assembled so the blade (15) is inserted into the first groove (10), the ball (5) is at the standard position, where the ball is not slanted at all. Therefore, the valve will behave as a standard ball valve and the largest flow coefficient is provided.

When the valve is assembled so the blade (15) is inserted into the second groove (16), the ball (5) is at a slanted position. The flow coefficient is therefore at a reduced value. (This position is shown in FIG. 1*a*.)

In FIG. 1*b*, an alternative version of stem is also shown. This stem (13) has a blade (14) that is shown offset to the side and at an angle to the centerline of the stem (13). When this stem (13) is used, the ball (5) is slanted already when the blade (14) is inserted into the first groove (10).

When the blade (14) is inserted into the second groove (16), the ball is very much slanted. The offset angles of the second groove (16) and the blade (14) are added to each other. The result is that the flow coefficient is very much reduced.

This can be seen in FIG. 1*c*.

By turning the stem (13) 180 degrees and installing the ball (5) with the blade (14) in the second grove (16) a third flow coefficient is provided, because the offset angles of the second groove (16) and the blade (14) are subtracted from each other. Actually, the same thing will happen, but at a different angle if the blade (14) is inserted in the first groove (10). The ball (5) and stem (13) can be installed in four different positions and provide four different flow capacities.

Additional grooves can be added to the ball. For example, at the bottom of the ball.

FIG. 2 shows how the opening (12) of the ball (5) and seats (8, 9) are interacting, when the ball is at the 90 degree position.

To the left there is a side view and to the right there is an end view.

The cross section area for the flow is different, depending upon how much the ball (5) is slanted.

As can be seen from the end view, the cross section is largest when there is no offset, because the cross section is defined by the inside diameter of the seats (8 and 9) only, which is about the same as the opening (12) through the ball (5).

The ellipses (12*a* and 12*b*) shows how the opening (12) interacts with the seat (8 and 9) openings. The first ellipse (12*a*) shows the opening in a ball that is offset by a relatively small angle and therefore the free area between the opening (12) and the seat (8 and 9) is slightly reduced.

The second ellipse (12*b*) shows the opening in a ball that is offset by a relatively large angle and the free area between the opening (12) and the seat (8 and 9) is therefore reduced to a larger extent.

FIG. 3 shows to the left, a side view of the ball (5) its opening (12), stem (6) and seats (8 and 9) when the valve is open.

To the right there is an end view where the stem (6) has turned the ball (5) to a near closed position. There are two ellipses (12*a* and 12*b*). They represent the opening of the ball at the same stem position, but at different slant of the ball.

The first ellipse (12*a*) belongs to a ball (5) with no slanting. The free area between the opening (12*a*) and the seat (8 or 9) is relatively large. It is defined by the semi-circle between points "a"–"b" and the semi-ellipse between points "a"–"b".

The second ellipse (12*b*) is belongs to a slanted ball (5). The free area between the opening (12*b*) and the seat (8 or 9) is relatively small. It is defined by the semi-circle between points "c"–"d" and the semi-ellipse between points "c"–"d".

As can be understood, the free area, and flow coefficient, is reduced all over the operating range 0–90 degrees when the ball is slanted. See FIG. 5.

FIG. 4 shows a side view of a ball (5). At the top side there are two grooves (10*a* and 10*b*) and at the bottom there are two grooves 10*c* and 10*d*).

By turning the ball (5) 180 degrees around the length axis of the bore, the top (10*a* and 10*b*) and bottom grooves (10*c* and 10*d*) will exchange positions.

When a stem (6) with a blade (15) that has not offset is used, the ball (5) can be installed in four different ways, resulting in zero offset, plus three different degrees of offset.

A stem (13) with an offset blade (14) can be installed with the blade in two 180 degree opposed positions. When a ball with four grooves is used, the ball (5) can be installed in eight different ways, resulting in eight different flow coefficients.

The ball (5) can have any practical number of grooves the surface of the ball permits. However, groove positions that are offset so much that they interfere with the seats (8 and 9) should be avoided.

Figure 5:
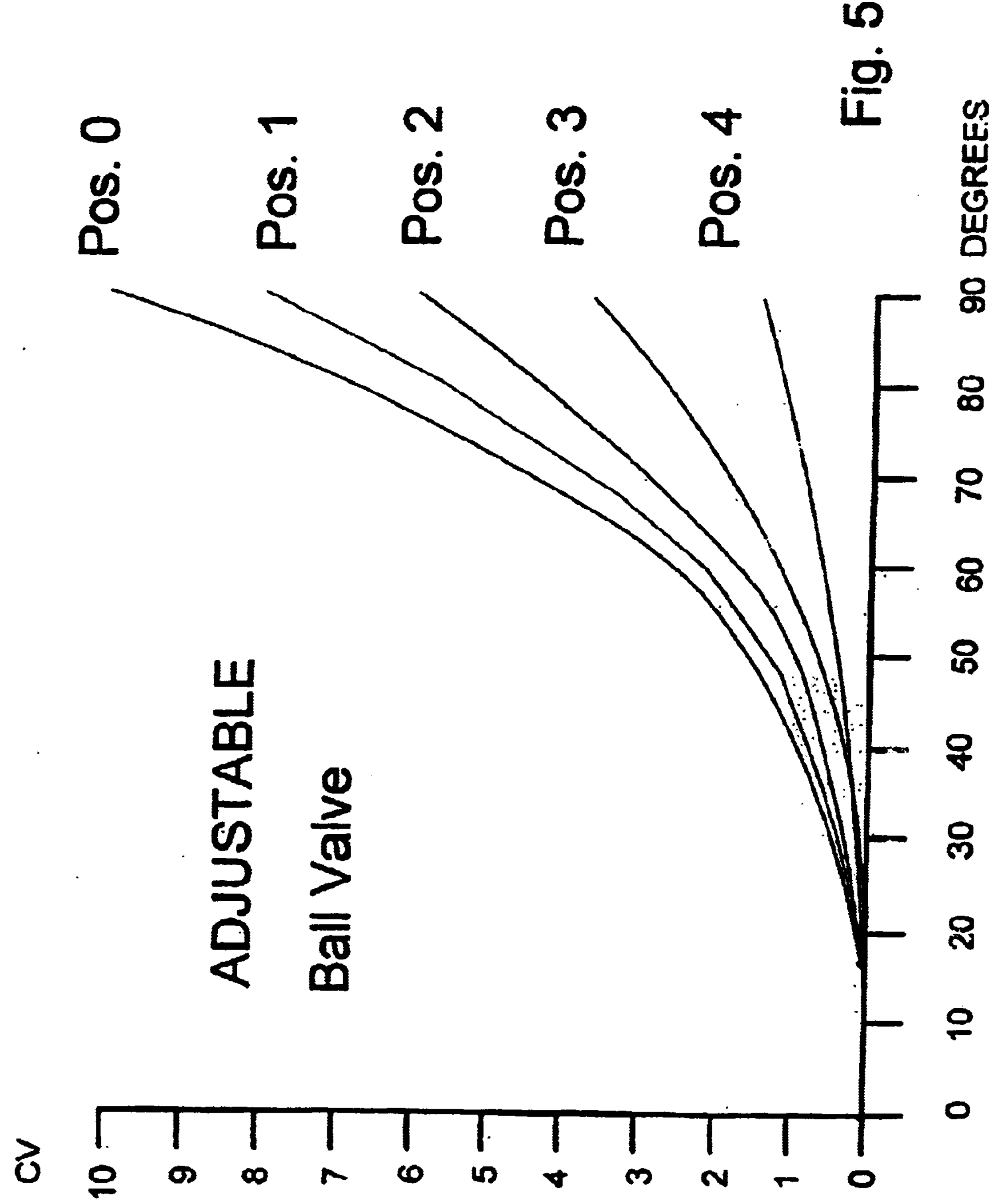

FIG. 5 shows a chart of the relationship between the stem (6 or 13) movement and the resulting CV value at the different positions 0–90 degress.

The ball is installed at different slanted positions versus the stem (6 or 13). The different positions are marked Pos. 1–Pos. 4.

At Pos. 1 there is no slanting of the ball (5). At Pos. 4 the ball (5) has the largest offset.

The inherent flow characteristics of a typical ball valve is close to equal percent, which is desirable for many control applications. When the flow coefficient is reduced, the equal percent characteristics is essentially maintained, but its curvature gets flatter.

FIG. 6*a* shows a stem (6) with a separate blade (17) attached. The part that engages the groove in the ball is offset to the side.

FIG. 6*b* is a side view of FIG. 6*a*.

FIG. 6*c* shows the ball (5) and the stem (6) with its blade (17) engaged in one of the grooves (18) of the ball.

FIG. 6*d* shows a stem (6) with double blades (17) engaged in one pair of grooves (17) of the ball (5). A second pair of grooves (19) are located on the opposite side of the ball (5). The first pair of grooves (18) orients the ball with the center line for its fluid flow passageway perpendicular to the axis of rotation of the ball.

The second pair of grooves (19) orients the ball with the center line for its fluid flow passageway at an angle different from perpendicular to the axis of rotation of the ball.

The part of the blade (17) that engages the groves (18) is shown in FIG. 6*c* and 6*d* parallel to the length axis of the stem (6).

However, any suitable angle can be used that matches the angle of the groove.

The blade (17) can have two parts engaging two grooves on the ball. One on each side of the center line for the stem. The blade (17) can have some spring action so the blade pushes against the side of the grooves and thereby eliminates play.

The invention can also be applied to three-way ball valves.

ADVANTAGES

The flow coefficient can be reduced to a value that is useful for modulating control, without the use of disks or balls with specially shaped openings. The cost is reduced.

When the ball (and stem) is disposed so the ball can be installed in with different degrees of offset, then the flow coefficient can selectively be changed in the field, without the need to exchange or add any parts. An essentially equal percent flow characteristics is maintained although the flow coefficient is changed.

Because one valve covers a large number of CV-values, inventory is reduced at all levels, from manufacturing through the chain of distribution. Also, the inventory at maintenance department of the end user is reduced. The apprehension of specifying the wrong (too small) CV-value is very much reduced, because it easily can be changed.

Future changes is the operating conditions can easily be met.

While particular embodiments of the present invention have been described in some detail above, changes and modifications may be made in the illustrated embodiments without departing from the form or spirit of the invention. It is therefore intended that the following claims cover all equivalent modifications and variations as fully within the scope of the invention as defined by the claims.

I claim:

1. A valve of the type having a casing provided with openings to be connected to a fluid pipe line and having a valve chamber therein with an inlet and an outlet port for defining a fluid path through the valve chamber, the valve comprising:

a ball mounted in the valve chamber between a pair of seats, and having an exterior surface and two ends and a fluid flow passageway extending between the ends of the ball, the ball is turned by a stem for selective adjustment between an open position and a closed position, with the ball and stem having an axis of rotation perpendicular to the centerline between the inlet and outlet ports, and the ball having the centerline for its fluid flow passageway at an angle different from perpendicular to the axis of rotation of the ball, where the ball is disposed so it can selectively be installed with its fluid flow passageway at two or more different angles to the axis of rotation of the ball.

2. The valve of claim 1, where the ball is fitted with more than one indentation that selectively can mate with the end of the Stem.

3. The valve of claim 1, where the stem is fitted with an end piece, to mate with one indentation in the ball, at a position that is offset versus the length axis of the stem.

4. The valve of claim 3, where the end piece can mate with one or more indentations in the ball.

5. The valve of claim 4, where the end piece is a separate part fastened to the stem.

* * * * *